(12) United States Patent
Inaka et al.

(10) Patent No.: US 11,504,686 B2
(45) Date of Patent: Nov. 22, 2022

(54) SYNTHESIS DEVICE AND MEASURING MECHANISM

(71) Applicant: TORAY ENGINEERING CO., LTD., Tokyo (JP)

(72) Inventors: Chisa Inaka, Otsu (JP); Tsukasa Niwa, Otsu (JP); Takashi Iwade, Otsu (JP); Kazunori Nakakita, Otsu (JP)

(73) Assignee: TORAY ENGINEERING CO., LTD., Tokyo (JP)

( * ) Notice: Subject to any disclaimer, the term of this patent is extended or adjusted under 35 U.S.C. 154(b) by 312 days.

(21) Appl. No.: 16/498,012

(22) PCT Filed: Mar. 16, 2018

(86) PCT No.: PCT/JP2018/010612
§ 371 (c)(1),
(2) Date: Sep. 26, 2019

(87) PCT Pub. No.: WO2018/180642
PCT Pub. Date: Oct. 4, 2018

(65) Prior Publication Data
US 2020/0254410 A1   Aug. 13, 2020

(30) Foreign Application Priority Data

Mar. 29, 2017 (JP) .............................. JP2017-065444
Mar. 29, 2017 (JP) .............................. JP2017-065475
Mar. 29, 2017 (JP) .............................. JP2017-065524

(51) Int. Cl.
*B01J 4/02* (2006.01)
*B01J 19/00* (2006.01)
*G01G 17/04* (2006.01)

(52) U.S. Cl.
CPC ................ *B01J 4/02* (2013.01); *G01G 17/04* (2013.01); *B01J 19/0046* (2013.01); *B01J 2219/00286* (2013.01)

(58) Field of Classification Search
CPC .............................. B01J 4/02; B01J 19/0046; B01J 2219/00351; B01J 2219/00286; B01J 2219/00698; G01G 17/04; G01G 17/06
See application file for complete search history.

(56) References Cited

U.S. PATENT DOCUMENTS

| 3,557,077 A | * | 1/1971 | Brunfeldt et al. | ..... C07K 1/045 137/12 |
| 4,830,508 A | * | 5/1989 | Higuchi | .............. B01F 13/1055 137/88 |

(Continued)

FOREIGN PATENT DOCUMENTS

| JP | 63-274440 A | 11/1988 |
| JP | 8-272456 A | 10/1996 |

(Continued)

OTHER PUBLICATIONS

International Search Report of the corresponding International Application No. PCT/JP2018/010612, dated Jun. 19, 2018.

*Primary Examiner* — Lessanework Seifu
(74) *Attorney, Agent, or Firm* — Global IP Counselors, LLP

(57) ABSTRACT

A synthesis device comprises a plurality of pipes, a feeding unit, a reaction vessel, and a measurement mechanism. The pipes extend from a plurality of storage containers, respectively, in which a plurality of types of solutions are stored. The feeding unit is configured to feed the solutions in the storage containers through the pipes. The solutions selectively fed from the storage containers are put in the reaction vessel to generate a synthesized product by chemical synthesis. The measuring mechanism is provided between the (Continued)

storage containers and the reaction vessel in a middle of an overall flow path including the pipes, the measuring mechanism being configured to measure the solutions fed to the reaction vessel.

11 Claims, 9 Drawing Sheets

(56) References Cited

U.S. PATENT DOCUMENTS

| | | | | |
|---|---|---|---|---|
| 8,926,907 | B2 * | 1/2015 | Albin | C10G 11/187 |
| | | | | 422/110 |
| 2008/0257446 | A1 * | 10/2008 | Oakes | B01F 15/0445 |
| | | | | 141/1 |
| 2013/0019988 | A1 * | 1/2013 | Jalenques | G01G 17/06 |
| | | | | 141/1 |

FOREIGN PATENT DOCUMENTS

| | | |
|---|---|---|
| JP | 9-10568 A | 1/1997 |
| JP | 2000-51685 A | 2/2000 |
| JP | 2002-518526 A | 6/2002 |
| JP | 2009-69150 A | 4/2009 |
| JP | 2015-120642 A | 7/2015 |

* cited by examiner

SYNTHESIS DEVICE AND MEASURING MECHANISM

CROSS-REFERENCE TO RELATED APPLICATIONS

This application is a U.S. National stage of International Application No. PCT/JP2018/010612 filed on Mar. 16, 2018. This application claims priority to Japanese Patent Application Nos. 2017-065444 filed on Mar. 29, 2017, 2017-065524 filed on Mar. 29, 2017 and 2017-065475 filed on Mar. 29, 2017. The entire disclosure of Japanese Patent Application Nos. 2017-065444, 2017-065524 and 2017-065475 are hereby incorporated herein by reference.

BACKGROUND

Field of the Invention

The present invention relates to a device for chemically synthesizing proteins, peptides, nucleic acids, and the like. The present invention also relates to a measuring mechanism used in a synthesis device, etc., for chemically synthesizing proteins, peptides, nucleic acids, and the like.

Background Information

One method for chemically synthesizing proteins, peptides, nucleic acids, and the like is to sequentially supply a plurality of types of solutions (reagents) to a reaction vessel, and allow a reaction to proceed in the reaction vessel. For example, when synthesizing a nucleic acid, numerous beads are provided in the reaction vessel, solutions are sequentially supplied to the reaction vessel while detritylation, coupling, oxidation, and capping treatments are repeatedly carried out, and bases are successively linked from the beads.

Quite a few types (such as 20 types) of solutions are sometimes used, and these solutions are selectively fed to the reaction vessel, where a synthesized product (nucleic acid) is produced from the molecular material contained in the solutions. The synthesis device described in Japanese Translation of PCT International Application Publication No. 2002-518526 (Patent Literature 1) is an example of a known device for performing such chemical synthesis.

SUMMARY

FIG. 8 is a simplified diagram illustrating a conventional synthesis device. This synthesis device comprises storage containers 90a, 90b, and 90c that individually store a plurality of types of solutions 99a, 99b, and 99c, a reaction vessel 94 in which the solutions 99a, 99b, and 99c are mixed, and a chamber 95 that houses the reaction vessel 94. The containers 90a, 90b, 90c and the chamber 95 are connected by pipes 91a, 91b, and 91c, respectively. In the example in FIG. 8, the pipes 91a, 91b, and 91c are provided corresponding to a first position P1, a second position P2, and a third position P3, respectively. On the other hand, the reaction vessel 94 is configured so that it can be moved within the chamber 95 by an actuator (not shown), and can be moved to and stopped at the first position P1, the second position P2, and the third position P3. Therefore, the reaction vessel 94 is configured such that it is selectively moved to the positions of the solutions 99a, 99b, and 99c to be mixed (the first position P1, the second position P2, and the third position P3), which is necessary for the production of the synthesized product (nucleic acid), and sequentially receives the solutions 99a, 99b, and 99c supplied from the downstream ends of the pipes 91a, 91b, and 91c at each position.

The supply of the solutions 99a, 99b, and 99c to the reaction vessel 94 is accomplished by pressurizing the solutions 99a, 99b, and 99c in the storage containers 90a, 90b, and 90c, and the solutions are fed by supplying an inert gas or the like into the storage containers 90a, 90b, and 90c. However, when the solutions 99a, 99b, and 99c are supplied by pressure feed, the feeding is performed merely by setting the pressure and duration, so variance is likely to occur in the feed amount due to the influence of pressure fluctuations and the like. For this reason, there is a risk that the intended chemical may not be synthesized if the feed amounts to the reaction vessel 94 are too large or too small. In view of this, to be safe, each of the plurality of types of solutions 99a, 99b, and 99c is supplied to the reaction vessel 94 in an amount that is several times larger than the theoretically required amount. Thus, with prior art, excess amounts of solutions are used, and this can drive up the cost, particularly when a synthesized product is being mass-produced.

Therefore, it is an object of the first aspect of the present invention to improve the usage efficiency of the solutions.

Also, a conventional synthesis device requires a mechanism for moving the reaction vessel 94, and the reaction vessel 94 has to be moved every time a solution is to be fed, which is a particular problem when more types of solutions are involved, because the device configuration and the processing operation become more complicated. This makes it more likely that problems will occur in the operation, and when a problem occurs, the chemical synthesis comes to a halt. In addition, since the reaction vessel 94 receives the supply of solutions after moving to the positions corresponding to the downstream ends of the pipes 91a, 91b, and 91c, there is also a problem in that a longer operation time is required for the synthesis.

In view of this, it is a second object of the present invention to provide a highly reliable synthesis device with a simplified device configuration.

It is an object of a third aspect of the present invention to provide a measuring mechanism that accurately measures solutions in order to improve the usage efficiency of the solutions.

The synthesis device according to the first aspect of the present invention is a device for selectively feeding a plurality of types of solutions and subjecting them to chemical synthesis, the device comprising a plurality of pipes extending from a plurality of storage containers, respectively, in which a plurality of types of solutions are stored, a feeding means for feeding the solutions in the storage containers through the pipes, a reaction vessel in which the solutions selectively fed from the storage containers are put to generate a synthesized product, and a measuring mechanism that is provided between the storage containers and the reaction vessel and in a middle of an overall flow path including the plurality of pipes, and measures the solutions fed to the reaction vessel.

With this synthesis device, the required amount of solutions can be measured and fed to the reaction vessel, and the usage efficiency of the solutions can be improved as compared to prior art.

Also, it is preferable if the measuring mechanism has a measuring container on which the plurality of pipes converge and into which the solutions from the pipes are introduced, respectively, and measures these solutions in the measuring container. With this measuring mechanism, a plurality of solutions are selectively introduced into the measuring container, and the solutions introduced into the measuring container are measured. Since the measuring container is shared by the plurality of pipes, a measuring mechanism is not required for every pipe (solution), and the synthesis device can be simplified. In addition, a plurality of types of solutions can be mixed and measured in the measuring container, and the mixing time can be shortened if the solutions are mixed at a stage prior to the introduction of the solutions into the reaction vessel.

Also, it is preferable if the measuring mechanism has a measuring container provided in a middle of the overall flow path, and a sensor that measures the weight in the measuring container or senses the liquid level of the solutions stored in the measuring container. With this configuration, the solutions can be temporarily held and measured in the measuring container, and the measured solutions can be fed to the reaction vessel.

Also, it is preferable if the synthesis device comprises an adjusting means for adjusting the feed rate of the solutions to be measured. When the feed rate is high, the measurement is prone to error (especially when the target amount is small), but measurement error can be suppressed by reducing the feed rate with the adjusting means.

Also, if the feed rate is lowered throughout the measurement, it takes time and work efficiency may be decreased, and if the feed rate is increased throughout the measurement, measurement error is more likely to occur. In view of this, it is preferable if the synthesis device comprises an adjusting means for lowering the feed rate during the feed termination time period for the measurement to a level below that during the prior time period. With this configuration, it is possible to increase working efficiency by raising the feed rate at the start of feeding for measuring, and it is possible to suppress measurement error by reducing the feed rate at the end of measuring.

It is also preferable if the synthesis device further comprises a valve that stops the feed for the measurement, and a control device that acquires sensor signals for the measurement at regular time intervals and outputs a closing operation start signal to the valve based on the signal. With this configuration, the solutions can be measured in real time, and a specific amount of solutions can be obtained very accurately.

It is also preferable if the synthesis device further comprises a valve that stops the feed for the measurement, wherein the valve starts to close before the solutions reach a prescribed amount. With this configuration, it is possible to measure accurately by estimating the solutions that will flow during the valve closing operation, and commencing the valve closing operation at an earlier timing in advance.

A second aspect of the present invention is a device for selectively feeding a plurality of types of solutions and subjecting them to chemical synthesis, the device comprising a plurality of pipes extending from a plurality of storage containers, respectively, in which a plurality of types of solutions are stored, a feeding means for feeding the solutions in the storage containers through the pipes, an intermediate container on which the plurality of pipes converge and into which the solutions from the pipes are introduced, respectively, and a reaction vessel in which the solutions fed from the intermediate container are put to generate a synthesized product.

With this synthesis device, solutions fed from the plurality of storage containers, respectively, are first introduced into the intermediate container, and then a synthesized product is generated from the solutions fed from the intermediate container to the reaction vessel. Accordingly, a mechanism for moving the reaction vessel is unnecessary, nor is it necessary to move the reaction vessel every time the solutions are fed as in prior art, so the processing operation is simplified. This means that the configuration of the device is simpler, there are fewer places where a problem may occur, and the resulting synthesis device is more reliable. In addition, the operation time required for the synthesis can be shortened.

Also, when it is necessary to mix several types of solutions, these solutions can first be mixed in the intermediate container and then fed to the reaction vessel, which improves the reaction efficiency.

It is also preferable if the synthesis device further comprises a sealed container that holds the intermediate container and is filled with a gas. In this case, even if the plurality of types of solutions being used include a solution that would be modified or degraded upon coming into contact with the atmosphere (outside air), a synthesized product can be generated without sacrificing quality.

Alternatively, the intermediate container can be a sealed container that is filled with a gas. Here again, even if the plurality of types of solutions being used include a solution that is modified or degraded upon coming into contact with the atmosphere (outside air), it is still possible to generate a synthesized product without sacrificing quality.

It is also preferable if the synthesis device further comprises a measuring mechanism that includes the intermediate container and a sensor for measuring the solutions introduced into the intermediate container. In this case, the intermediate container is used as the measuring container. The necessary amount of solutions can then be measured and fed to the reaction vessel, and the usage efficiency of the solutions can be improved. Also, even if a plurality of types of solutions are necessary, only one set of the measuring mechanism (intermediate container and sensor) is required since a plurality of pipes converge and each solution is received in the intermediate container.

It is also preferable if the sensor is a weight sensor that measures the weight in the intermediate container, and the measuring mechanism further has a holding unit that brings together and holds the plurality of pipes, and is provided in a state of non-contact with the intermediate container. If the pipes extending from the storage containers are in contact with the intermediate container, then if tension is applied to the pipes, for example, this will adversely affect the measurement result produced by the weight sensor. With the above configuration, however, very accurate measurement is possible, without the weight sensor being affected by the pipes.

In addition, because a plurality of pipes converge on the intermediate container, the intermediate container comes into contact with a plurality of types of solutions, and therefore may need to be washed. In view of this, it is preferable to use a configuration in which the downstream ends of the plurality of pipes open into the intermediate container at a position below the upper end of the intermediate container, the plurality of pipes include a pipe for introducing a cleaning liquid into the intermediate container, and the sensor is configured to be able to detect a state in which the solutions have been introduced up to no higher than a first position that is lower than the openings on the downstream ends, and a state in which the cleaning liquid has been introduced up to a second position that is higher than the openings on the downstream ends.

Alternatively, the configuration may be such that the downstream ends of the plurality of pipes open into the intermediate container at a position below the upper end of the intermediate container, the plurality of pipes include a pipe for introducing a cleaning liquid into the intermediate container, and the feeding means feeds the solution so as to result in a state in which the solutions have been introduced up to no higher than a first position that is lower than the openings on the downstream ends, or a state in which the cleaning liquid has been introduced up to a second position that is higher than the openings on the downstream ends.

With each of these configurations, it is possible to wash the intermediate container and the downstream ends of the pipes in the intermediate container with the cleaning liquid introduced up to the second position. Also, in measuring, introducing the solutions up to the first position prevents the introduced solutions from coming into contact with other pipes, and prevents the purity of the solutions from decreasing.

The cleaning liquid is preferably the main solvent that is used in the plurality of types of solutions, the reason being that, if any cleaning liquid should remain in the intermediate container, a decrease in the purity of the solutions can be prevented.

It is also preferable if the synthesis device comprises a holding unit that brings together and holds the plurality of pipes, wherein the solutions are introduced into the intermediate container from the plurality of pipes brought together and held by the holding unit, respectively, and the holding unit holds the plurality of pipes in a state in which the downstream end of one of the plurality of pipes is not in contact with the downstream ends of the other pipes. With this configuration, the solution flowing out of the downstream end of the one pipe can be kept from coming into contact with the downstream end of the other pipes, which is favorable when the purity of the solutions that are temporarily in the intermediate container needs to be maintained.

The third aspect of the present invention is a measuring mechanism that selectively acquires and measures a plurality of types of solutions, comprising a holding unit that holds the downstream end sides of pipes through which the solutions pass, a measuring container that receives the solutions flowing out of the downstream ends of the pipes, and a weight sensor for measuring the weight in the measuring container, wherein the holding unit and the measuring container are provided in a non-contact state.

This invention makes it possible to manage the amounts of solutions. When the pipes through which the solutions pass are in contact with the measuring container, the measuring result produced by the weight sensor will be adversely affected if tension is applied to the pipes, for example, but the above configuration makes highly accurate measurement possible, without the weight sensor being affected by the pipes.

It is also preferable if the holding unit brings together and holds a plurality of pipes through which a plurality of types of the solutions pass, respectively, and the measuring container receives the solutions flowing out of the plurality of the pipes. In this case, a plurality of types of solutions are necessary, but the measuring container and sensor used for measuring can be shared.

It is also preferable if the measuring mechanism further comprises a sealed container that holds the measuring container and is filled with a gas. With this configuration, even if the plurality of types of solutions being used include a solution that is modified or degraded upon coming into contact with the atmosphere (outside air), quality need not be sacrificed.

It is also preferable if the measuring mechanism comprises an outlet-side pipe that is connected to the measuring container and is used for feeding the measured solutions to another region, wherein the outlet-side pipe is constituted by an extra length portion that is connected at one end to the measuring container and is supported at the other end by another member, that is formed longer than the distance between the one end and the other end, and that is deformable as a whole. When, for example, tension is exerted on the outlet-side pipe as an external force, the measurement result produced by the weight sensor will be adversely affected, but with the above configuration, the external force can be released through elastic deformation of the extra length portion as a whole, the influence of the outlet-side pipe will tend not to extend to the weight sensor, and highly accurate measurement will be possible.

It is also preferable if the measuring mechanism comprising the sealed container further comprises an adjusting means for adjusting the pressure of the gas in the sealed container, wherein the solutions in the measuring container is pressure fed to the outside by the pressure of the gas acting on the solutions in the measuring container, going through an opening in the measuring container formed by having the holding unit and the measuring container be in non-contact. With this configuration, the solutions in the measuring container can be pressure fed by the gas in the sealed container. This means that there is no need for a pump to feed the solutions.

With the first aspect of the present invention, the necessary amounts of solutions can be measured out and fed to the reaction vessel, and the usage efficiency of the solutions can be improved as compared to prior art.

With the second aspect of the present invention, there is no need for a mechanism for moving the reaction vessel, nor is there any need to move the reaction vessel every time a solution is to be fed, so the processing operation is simplified. Therefore, the configuration of the device is also simplified, there are fewer places where a problem may occur, and a highly reliable synthesis device is obtained.

With the third aspect of the present invention, it is possible to manage the amounts of the solutions in order to improve the usage efficiency of the solutions, and very accurate measurement can be carried out.

DETAILED DESCRIPTION OF EMBODIMENTS

Overall Configuration of Synthesis Device

Figure 1:
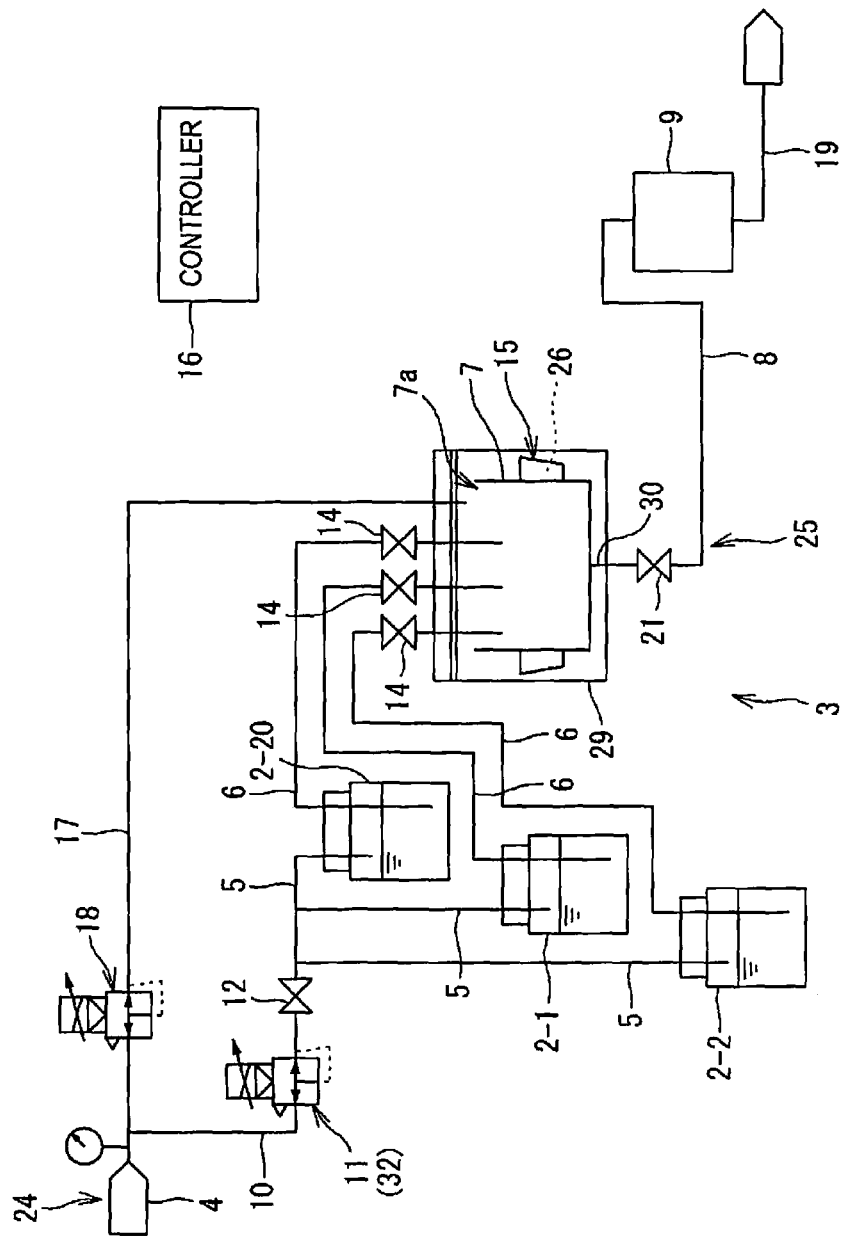
FIG. 1 is a configuration diagram showing an example of the synthesis device of the present invention.

FIG. 1 is a configuration diagram showing an example of the measuring mechanism of the present invention and the synthesis device of the present invention provided with this measuring mechanism. The synthesis device of the present invention is used for chemically synthesizing proteins, peptides, nucleic acids, and so forth, and sequentially supplies a plurality of types of solutions (reagents) to a reaction vessel 9, with the solutions being subjected to chemical synthesis in the reaction vessel 9. When synthesizing a nucleic acid, numerous beads are provided in the reaction vessel 9, detritylation, coupling, oxidation, and capping treatments are repeatedly carried out while solutions are sequentially supplied to this reaction vessel 9, and molecular materials such as bases are successively linked from the beads. Well over a dozen types of solutions (for example, 20 types) may be used, and these solutions are selectively fed to the reaction vessel 9, where a synthesized product (nucleic acid) is generated by the molecular materials contained in the solutions.

In this embodiment, 19 types of solutions (reagents) are used. This number changes according to the product to be chemically synthesized. The synthesis device 3 is equipped with a region in which are provided the same number (19) of storage containers (reagent bottles) 2-1, 2-2, . . . as the number of types of solutions, and each types of solutions is stored in respective one of the storage containers 2-1, 2-2, . . . . In FIG. 1, only two storage containers (2-1 and 2-2) are shown, and the other storage containers (2-3 to 2-19) are not depicted. The synthesis device 3 also comprises a storage container 2-20 filled with a cleaning liquid. The storage containers 2-1 to 2-20 all have the same configuration (although the size may vary). In the following description, the reference numeral attached to the container is simply "2." Each storage container 2 is a sealed container, but an introduction pipe 5 and an outlet pipe 6 are connected.

The synthesis device 3 comprises a tank 4 filled with pressurized gas, the introduction pipes 5, the outlet pipes 6, an intermediate container 7, an intermediate pipe 8, the reaction vessel 9, a measuring mechanism 15, and a control device 16. The tank 4 is filled with a gas whose pressure is higher than that of the atmosphere. In this embodiment, the tank 4 is filled with argon gas as an inert gas. A sterilized gas (air) may be used instead of an inert gas. The introduction pipes 5, which are provided in the same number as the plurality of storage containers 2 (20 in this embodiment), are pipes that branch off from a shared upstream pipe 10, and this upstream pipe 10 is provided with a regulator (electropneumatic regulator) 11 and a shutoff valve 12. The upstream pipe 10 is connected to the tank 4, pressurized gas is supplied to each storage container 2, and the internal pressure of each storage container 2 is adjusted by the regulator 11. The internal pressure of each storage container 2 is increased by the pressurized gas, and the solutions in the storage containers 2 are pressure fed out of the outlet pipes 6. That is, the solution in each storage container 2 is pressure fed through the outlet pipe 6 to the intermediate container 7 by the pressure differential between each storage container 2 and the intermediate container 7. As described above, in this embodiment, a feeding means 24 for feeding the solutions in the storage containers 2 is a pressure-feed type, and the feeding means 24 includes the tank 4, the upstream pipe 10, the regulator 11, the shutoff valve 12, and the introduction pipes 5.

A valve 14 is provided to each outlet pipe 6 connected to a storage container 2 that stores a solution. The valves 14 in this embodiment are pinch valves. At least one portion of the outlet pipe 6 is constituted by a pipe (tube) that can be elastically deformed, and the pinch valve 14 has a function of halting the flow of a solution from a storage container 2 along the outlet pipe 6 by pinching the outlet pipe 6 (the above-mentioned portion thereof), and also has a function of adjusting the flow of the solution. By selecting the pinch valve 14 to be opened, a specific solution from among the solutions in the plurality of storage containers 2 can be selectively fed (pressure fed) through an outlet pipe 6 to the intermediate container 7. Selection of the pinch valve 14 to be opened is performed by the control device 16. That is, the control device 16 transmits an opening signal to a specific pinch valve 14 according to a program stored in an internal memory, and the other pinch valves 14 are kept closed. The valves provided to the outlet pipes 6 may be something other than the pinch valves 14.

As will be described below, the intermediate container 7 is a container used for measuring the solutions. The intermediate container 7 is a bottomed cylindrical container that can store the solutions (see FIG. 2), and in this embodiment, a plurality of the outlet pipes 6 converge on the inlet region (opening 7a) of the intermediate container 7. Accordingly, a solution selectively fed through an outlet pipe 6 is introduced into the intermediate container 7, and accumulates in the intermediate container 7. The number of intermediate containers 7 is smaller than the number of the storage containers 2, and in this embodiment, only one intermediate container 7 is provided. That is, the intermediate container 7 is shared for a plurality of types of the solutions.

The measuring mechanism 15 measures the solutions held in the intermediate container 7. With this measuring mechanism 15, the intermediate container 7 is made to function as a measuring container. The measurement result produced by the measurement mechanism 15 is transmitted to the control device 16 (see FIG. 1), and the control device 16 controls the opening and closing operation of the pinch valves 14 based on the measurement result, and acquires the prescribed amount of the solutions in the intermediate container 7. This prescribed amount of the solutions is then fed through the intermediate pipe 8 to the reaction vessel 9. The intermediate pipe 8 is provided with a shutoff valve 21. The shutoff valve 21 is closed when measurement is being performed.

The method by which the solutions are supplied from the intermediate container 7 to the reaction vessel 9 is pressure feeding, and the pressurized gas in the tank 4 is used. In this pressure feeding, the shutoff valve 21 is open. For this pressure feeding, the measuring mechanism 15 is equipped with a sealed container 29 that houses the intermediate container 7. A pressurized gas pipe 17 is provided between the sealed container 29 and the tank 4. The pipe 17 is provided with a second regulator (electropneumatic regulator) 18. As will be discussed below, the intermediate container 7 opens into the sealed container 29 (the opening 7a), and the pressure of the pressurized gas in the sealed container 29 (internal pressure) acts on the solutions in the intermediate container 7, so that the solutions in the intermediate container 7 are pressure fed through the intermediate pipe 8 to the reaction vessel 9 by the pressure differential between the sealed container 29 (intermediate container 7) and the reaction vessel 9.

As described above, one or more solutions are selectively fed from the plurality of the storage containers 2 to the intermediate container 7, and when the measurement is performed in the intermediate container 7, the solutions are sent to the reaction vessel 9. This supply of the solutions to the reaction vessel 9 is repeatedly performed while changing the type of solutions, the plurality of types of solutions are sequentially supplied to the reaction vessel 9, and chemical synthesis proceeds in the reaction vessel 9. In this embodiment, the reaction vessel 9 is provided with numerous beads, and bases are successively linked from the beads to synthesize nucleic acids.

In the reaction vessel 9, when a solution is supplied from the intermediate pipe (primary side flow path) 8, this solution is allowed to pass through and is discharged through a discharge-side pipe 19 (secondary side flow path).

Operation of the various valves (the pinch valves 14 and the shutoff valves 12 and 21) is controlled by the control device 16. The control device 16 also controls the operation of the regulators 11 and 18.

As described above, this synthesis device 3 selectively feeds the plurality of types of solutions to the reaction vessel 9 and uses the materials contained in the solutions to perform chemical synthesis in the reaction vessel 9. In this embodiment, the plurality of outlet pipes 6 are provided as a plurality of pipes extending from the plurality of storage containers 2 holding the plurality of types of solutions, and the feeding means 24, including the tank 4, the upstream pipe 10, the introduction pipes 5, and so forth, feeds the solutions in the storage containers 2 through the outlet pipes 6 to the intermediate container 7, and from there to the reaction vessel 9. The measuring mechanism 15 is provided between the storage containers 2 and the reaction vessel 9, in a middle of the overall flow path 25 including the plurality of pipes (outlet pipes 6), and the solutions sent to the reaction vessel 9 are measured in the intermediate container 7 by this measuring mechanism 15. The prescribed amounts of the solutions selectively sent from the plurality of storage containers 2 are put into the reaction vessel 9, and a synthesized product is generated from the materials contained in the solutions. The overall flow path 25 includes a flow path on the downstream side (reaction vessel 9 side) of the storage containers 2, and includes the intermediate pipe 8 in addition to the outlet pipes 6. The pipes and devices included in the overall flow path 25 have the property (solvent resistance) of being able to withstand the solvent (solvating medium) of the solution.

Measuring Mechanism 15

The measuring mechanism 15 has the intermediate container 7 that functions as a measuring container, and a sensor 26. As described above, the intermediate container (measuring container) 7 is provided in a middle of the overall flow path 25, and receives the solutions selectively flowing out from the plurality of outlet pipes 6. The sensor 26 had by the measuring mechanism 15 shown in FIG. 2 measures the weight in the intermediate container 7. To describe a specific configuration, the sensor 26 is a weight sensor, and in this embodiment is constituted by a strain type of load cell. With the measuring mechanism 15, the solutions in the intermediate container 7 can be accurately measured by weighing the solutions held in the intermediate container 7. In this embodiment, an example is given in which a strain type of load cell is used, but any load cell can be used, such as an electromagnetic type, a piezoelectric element type, a capacitance type, a magnetostrictive type, or a gyro type, and any of these may be used for the weight sensor of the present invention.

Also, a sensor 26-2 (see FIG. 3) for sensing the level of the solutions held in the intermediate container 7 may be used instead of the weight sensor 26. A specific configuration in this case will be described below.

Figure 2:
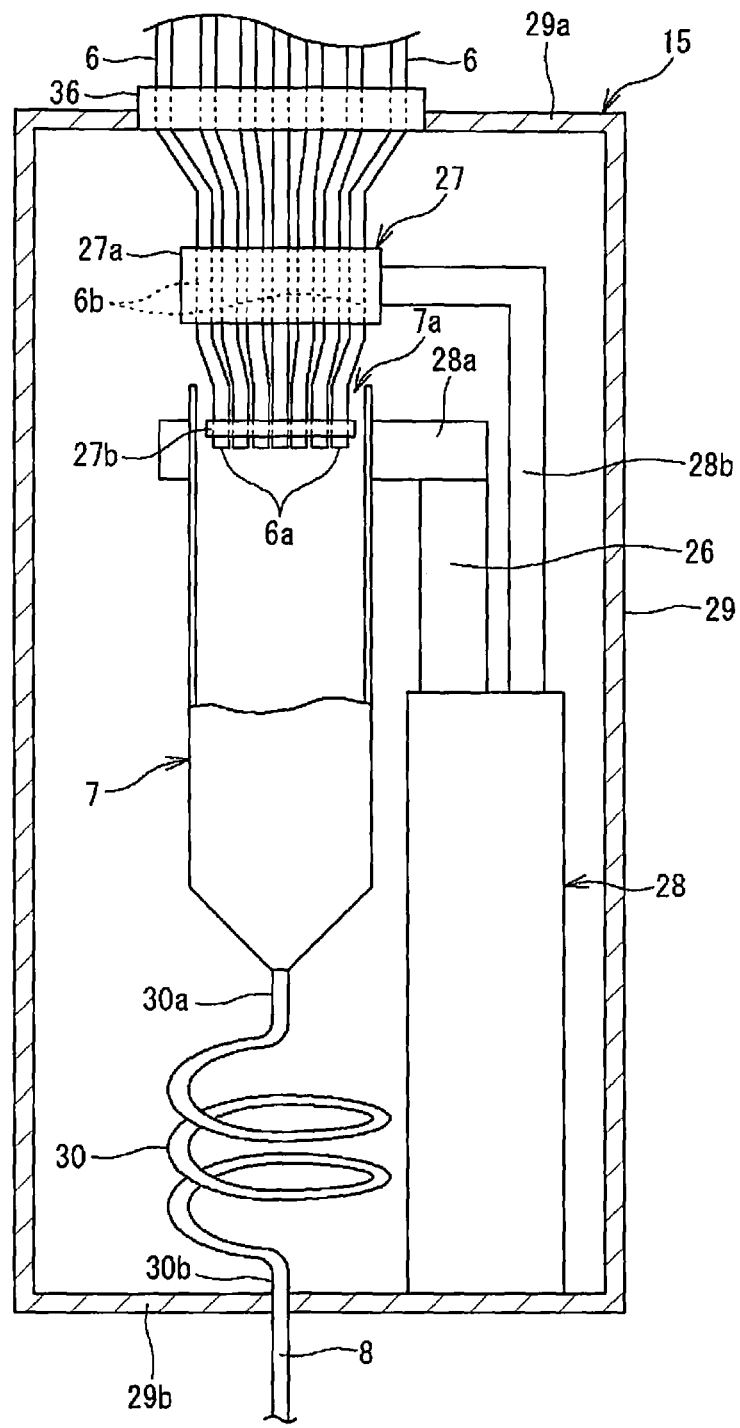
FIG. 2 is a diagram of the simplified configuration of the measuring mechanism.

The measuring mechanism 15 shown in FIG. 2 has a holding unit 27 in addition to the intermediate container 7 that receives the solutions flowing out from the outlet pipes 6 and the weight sensor 26 that measures the weight in the intermediate container 7. The holding unit 27 is provided near the opening 7a of the intermediate container 7, and holds the plurality of outlet pipes 6 so that they converge on one place. In this embodiment, 20 outlet pipes 6, which is the same number as the storage containers 2, are collected and held by the holding unit 27. As shown in FIG. 2, the plurality of outlet pipes 6 pass through a flange 36 provided to the upper wall 29a of the sealed container 29, and the sides of the downstream ends 6a of the outlet pipes 6 are collected and held by the holding unit 27. The outlet pipes 6 pass through the flange 36, but an airtight state is maintained between these (that is, they are sealed). In this embodiment, a case is described in which the outlet pipes 6 and the storage containers 2 are used in the same number, but if there are storage containers 2 whose solutions do not require measuring, the outlet pipes 6 extending from those storage containers 2 do not need to be held by the holding unit 27, and may instead be connected to the intermediate pipe 8 located downstream from the intermediate container 7.

The intermediate container 7 is provided in a state of being suspended inside the sealed container 29. To this end, a support member 28 is provided in the sealed container 29, the intermediate container 7 is supported by a first arm 28a had by this support member 28, and the weight of the intermediate container 7 and of the solutions held in the intermediate container 7 is borne by the first arm 28a. The weight sensor (such as a load cell) 26 is attached to the base side of the first arm 28a, and the weight sensor 26 measures the weight of the intermediate container 7 (including the solutions) via the arm 28a. A signal from the weight sensor 26 is inputted to the control device 16 (see FIG. 1). Also, the holding unit 27 (the first member 27a) is supported by a second arm 28b of the support member 28. The first arm 28a and the second arm 28b are provided independently, and no force is transmitted between them.

Figure 5:
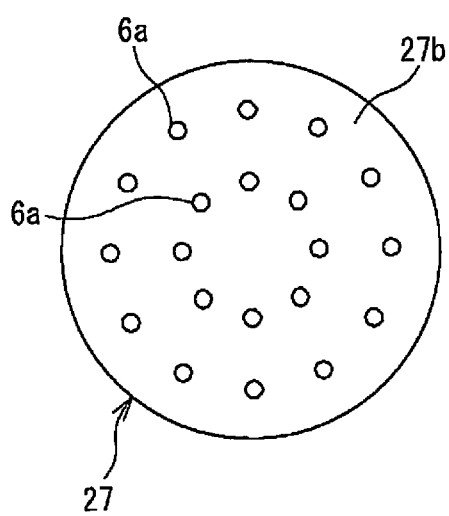
FIG. 5 is a diagram illustrating a holding unit as viewed from below.

The holding unit 27 has a first member 27a that collects and holds the portions 6b that are upstream from the downstream ends 6a of the plurality of outlet pipes 6, and a second member 27b that collects and holds the downstream ends 6a, and these members are connected together by a connector (not shown). The first member 27a is a plate-like member, and the outlet pipes 6 pass through this. The second member 27b is a plate-like member, and the downstream ends 6a of the outlet pipes 6 pass through this. FIG. 5 is a diagram of the holding unit 27 (second member 27b) as viewed from below. With the second member 27b, all the downstream ends 6a are disposed apart from each other, separated by a spacing that is narrower than the spacing at which they are held by the first member 27a. That is, the second member 27b functions as a spacer, so that one downstream end 6a is in a state of non-contact with the other downstream ends 6a, and the solution flowing out from the downstream end 6a of one outlet pipe 6 does not come into contact with the downstream ends 6a of the other outlet pipes 6 (that is, the solution that flows out from the downstream end 6a of one outlet pipe 6 and is to be supplied, will not mix with the solutions adhering to the downstream ends 6a of the other outlet pipes 6).

In FIG. 2, the first member 27a is positioned above (outside) the intermediate container 7, and the second member 27b is positioned inside the intermediate container 7, but the holding unit 27, including the first member 27a and the second member 27b, and the plurality of outlet pipes 6 (the downstream ends 6a) held by the holding unit 27 are in a state of non-contact with the intermediate container 7. Accordingly, the intermediate container 7 is in a state of being open at the top, that is, it is not covered by the holding unit 27, and the intermediate container 7 is in a state of opening into the sealed container 29. Consequently, as described above, the pressure of the pressurized gas in the sealed container 29 (internal pressure) can act on the solutions held in the intermediate container 7, and after measurement, the solutions in the intermediate container 7 will be pressure fed to the reaction vessel 9 by the differential pressure between the sealed container 29 and the reaction vessel 9.

Thus, with the measuring mechanism 15 in this embodiment, the plurality of outlet pipes 6 converge on the intermediate container 7, and the solutions are selectively supplied from the plurality of outlet pipes 6, so a plurality of types of solutions can be selectively acquired and measured. It is therefore possible to manage the amount of the solutions and to accurately feed the prescribed amount of the solutions to the reaction vessel 9. As discussed above, the holding unit 27 and the intermediate container 7 are provided in a state of non-contact. Therefore, even though tension may be exerted on the outlet pipes 6, the load produced by this tension will not affect the measurement of the weight sensor 26. If the outlet pipes 6 (and the holding unit 27) should come into contact with the intermediate container 7, then any tension acting on the outlet pipes 6 will adversely affect the measurement result produced by the weight sensor 26. However, with the configuration of this embodiment, the influence of the outlet pipes 6 will not extend to the weight sensor 26, so very accurate measurement is possible, and the prescribed amount of the solutions can be more accurately fed to the reaction vessel 9.

As shown in FIG. 2, the measuring mechanism 15 has an outlet-side pipe 30 connected to the intermediate container 7, and the outlet-side pipe 30 is also connected to the intermediate pipe 8. The outlet-side pipe 30 is a flow path for feeding the solutions measured in the intermediate container 7 through the intermediate pipe 8 to the reaction vessel 9 (another region). The outlet-side pipe 30 is disposed in the sealed container 29, one end 30a of the outlet-side pipe 30 is connected to the lower end of the intermediate container 7, and the other end 30b of the outlet-side pipe 30 is supported by the bottom wall 29b (separate member) of the sealed container 29. The outlet-side pipe 30 is constituted by an elastic tube that has a spiral shape as a whole. When tension is acting as an external force on the outlet-side pipe 30, this adversely affects the measurement result produced by the weight sensor 26, but with the configuration of this embodiment, the entire spiral tube is subjected to elastic deformation, which releases this tension. As a result, the influence of the outlet-side pipe 30 is less likely to affect the weight sensor 26, and more accurate measurement is possible. The outlet-side pipe 30 of this embodiment was described as having a spiral shape, but it may have any shape which has enough extra length that it will not affect the weight sensor 26 holding the measuring container 7, and may instead be bent in a U shape, etc. Thus, the outlet-side pipe 30 may be configured such that the one end 30a is connected to the intermediate container 7 and the other end 30b is supported by the sealed container 29, the pipe is formed longer than the distance between these ends 30a and 30b (straight line distance), and the pipe has an extra length portion that is deformable over its entire length. That is, the extra length portion may be a spiral tube or a tube bent into a U shape.

As described above, the sealed container 29 houses the intermediate container 7, and the upper part of the intermediate container 7 opens into the sealed container 29. This means that the gas in the sealed container 29 comes into contact with the solutions introduced into the intermediate container 7. In view of this, the sealed container 29 is filled with a gas having little influence on the solutions. As mentioned above, an inert gas or a sterilized gas (air) can be employed as this gas. In this embodiment, the sealed container 29 is filled with argon gas as an inert gas, and this gas is supplied from the tank 4. Accordingly, even if the plurality of types of the solutions being used in the synthesis device 3 include a solution that would be modified or degraded upon coming into contact with the atmosphere (outside air), a synthesized product can be generated without sacrificing quality.

The gas filling the sealed container 29 is also used as a medium for pressure feeding the solutions that have been stored (and measured) in the intermediate container 7 to the reaction vessel 9. The regulator 18 provided to the pressurized gas pipe 17 (see FIG. 1) connecting the sealed container 29 and the tank 4 adjusts the amount of gas supplied to the sealed container 29. Consequently, the internal pressure of the sealed container 29 is adjusted and the pressure of the solutions stored in the intermediate container 7 is controlled. This produces a differential pressure between the sealed container 29 (intermediate container 7) and the reaction vessel 9, and the solutions in the intermediate container 7 are pressure fed to the reaction vessel 9 by this pressure difference.

As described above, the measuring mechanism 15 in this embodiment also functions to feed the solutions stored and measured in the intermediate container 7 to the reaction vessel 9. That is, the regulator 18 is provided as an adjusting means for adjusting the gas pressure inside the sealed container 29. As mentioned above, the holding unit 27 that collects and holds the plurality of outlet pipes 6, and the intermediate container 7 are in a state of non-contact, which forms the opening 7a in the intermediate container 7 inside the sealed container 29. Through this opening 7a, the solutions in the intermediate container 7 can be pressure fed to the outside by the pressure of the gas acting on the solutions in the intermediate container 7.

In this embodiment, since the feed of the solutions from the plurality of storage containers 2 to the intermediate container 7 and the feed of the solutions from the intermediate container 7 to the reaction vessel 9 are performed by the feeding means 24 including the tank 4, there is no need for pumps (electric pumps or hydraulic pumps) for feeding the solutions. Also, the synthesis device 3 can be simplified by using the pressurized air of the shared tank 4 for both feeding the solutions from the plurality of storage containers 2 to the intermediate container 7 and feeding the solutions from the intermediate container 7 to the reaction vessel 9.

Modification Example of Measuring Mechanism 15

Figure 3:
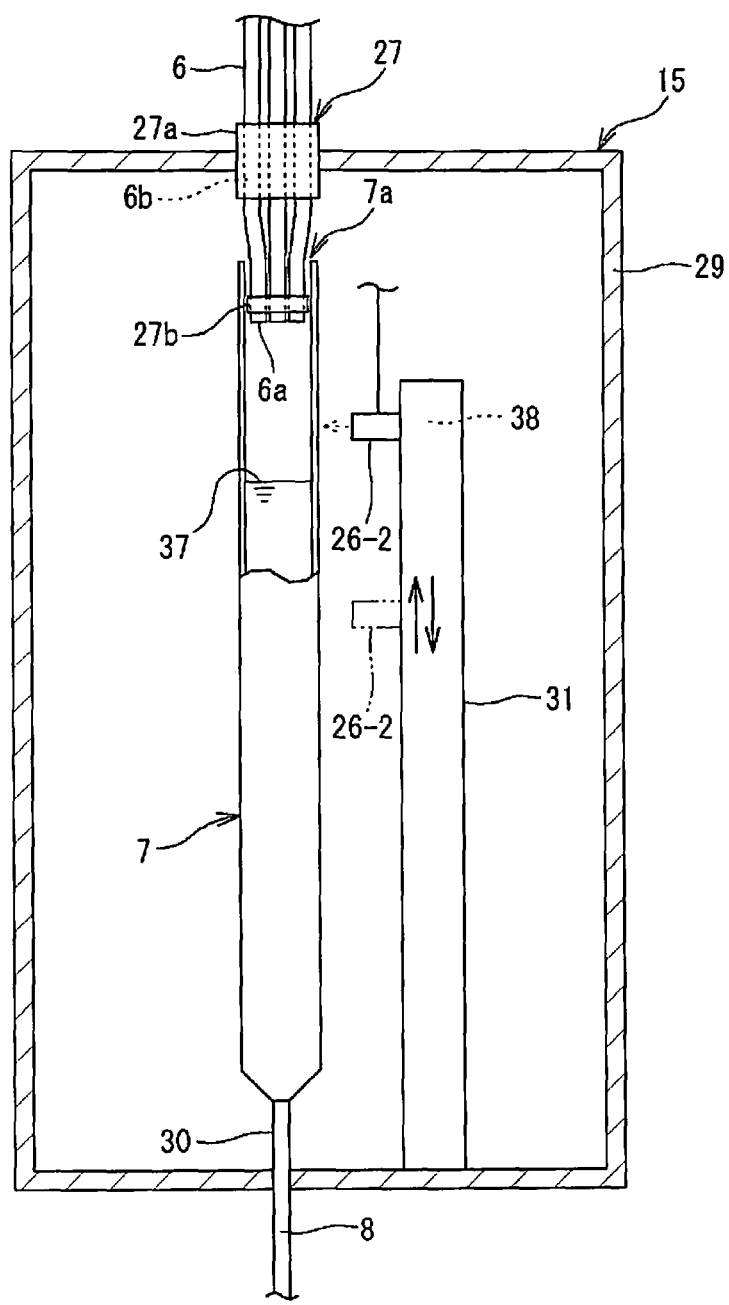
FIG. 3 is a diagram of the simplified configuration of a second example of a measuring mechanism.

We will now describe a case in which the sensor provided to the measuring mechanism 15 is configured to sense the level of the solutions held in the intermediate container 7 (hereinafter referred to as the second example). FIG. 3 is a simplified configuration diagram showing the second example of the measuring mechanism 15. Again in the second example, the measuring mechanism 15 has the intermediate container 7 that functions as a measuring container. The intermediate container 7 is provided in a middle of the overall flow path 25 (see FIG. 1), just as shown in FIG. 2 (first example), and receives the solutions selectively flowing out from the plurality of outlet pipes 6. Also, the plurality of outlet pipes 6 converge on the holding unit 27, and the downstream ends 6a of the outlet pipes 6 are introduced into the opening 7a of the intermediate container 7.

Unlike in the first example, a sensor 26-2 had by the measuring mechanism 15 in the second example senses the level 37 of the solutions introduced into the intermediate container 7. That is, the sensor 26-2 is installed at a specific height position with respect to the intermediate container 7, and when the solutions are introduced from the outlet pipes 6 into the intermediate container 7, the level 37 thereof gradually rises, and once the level 37 reaches a specific height, this is detected and a signal is transmitted to the control device 16. The sensor 26-2 can be a non-contact displacement sensor, such as a laser sensor.

In the case of the second example, the intermediate container 7 is preferably an elongated container. The purpose of this is to increase resolution during measurement. That is, the reason for giving the intermediate container 7 an elongated shape is that minute differences in volume more readily appear as a difference in height that way. For example, if the intermediate container 7 has a circular cross section, it is preferable for it to have an elongated shape whose height is at least ten times the diameter of the cross section.

A prescribed amount of the solutions is measured in the intermediate container 7, but this prescribed amount will vary with the solutions. That is, again in the second example, a single intermediate container 7 is shared in measuring a plurality of types of the solutions (a plurality of storage containers 2), so if the prescribed amount (required amount) varies depending on the type of the solutions, the height of the level 37 in the intermediate container 7 will also vary. In view of this, in the second example, the sensor 26-2 is supported by the support member 31 so as to be able to move up and down, and the height position of the sensor 26-2 can be altered by a lift actuator 38 according to the solutions to be measured. This change is based on a signal from the control device 16.

In the second example, because the sensor 26-2 senses the level of the solutions in the intermediate container 7, the influence of tension on the outlet pipes 6 is unrelated to the measurement result. Accordingly, the intermediate container 7 and the holding unit 27 on which the outlet pipes 6 converge need not be in a state of non-contact as in the first example. Also, the outlet-side pipe 30 connected to the bottom of the intermediate container 7 need not be a spiral tube. Further, when the holding unit 27 and the intermediate container 7 are brought into contact with each other, the sealed container 29 is not necessary. That is, as in a third example shown in FIG. 4, the holding unit 27 functions as a lid of the intermediate container 7, and the holding unit 27 closes off the opening of the intermediate container 7, making the inside of the intermediate container 7 a sealed space. When each solution is supplied to the sealed intermediate container 7 and measurement is completed, gas is supplied from the tank 4 to the intermediate container 7 through the pipe 17, and the solutions in the intermediate container 7 can be pressure fed to the reaction vessel 9. In the first example, the second example, and the third example, those components that are same are numbered the same, and components that are the same will not be described again.

In the third example, the intermediate container 7 is a sealed container filled with gas. In the third example, the first member 27a of the holding unit 27 closes off the upper opening of the intermediate container 7. The plurality of outlet pipes 6 pass through the first member 27a, but an airtight seal is ensured between the outlet pipes 6 and the first member 27a (that is, they are sealed). The upper opening of the intermediate container 7 is narrow, and a septum 39 is used for the first member 27a in order to ensure airtightness between the first member 27a that covers the upper opening and each of the plurality of (20 in this embodiment) outlet pipes 6. The septum 39 is a rubber film member, and the holes produced by penetration are closed off by the elastic force of the film in a state in which the outlet pipes 6 have penetrated it, allowing the inside and outside of the intermediate container 7 to be blocked from each other. This result in a configuration in which the intermediate container 7 is filled with gas, and even if the plurality of types of solutions being used include a solution that is modified or degraded by contact with the atmosphere (outside air), it is still possible to produce a synthesized product without sacrificing quality.

Measuring Mechanism 15 in Various Modes

Figure 4:
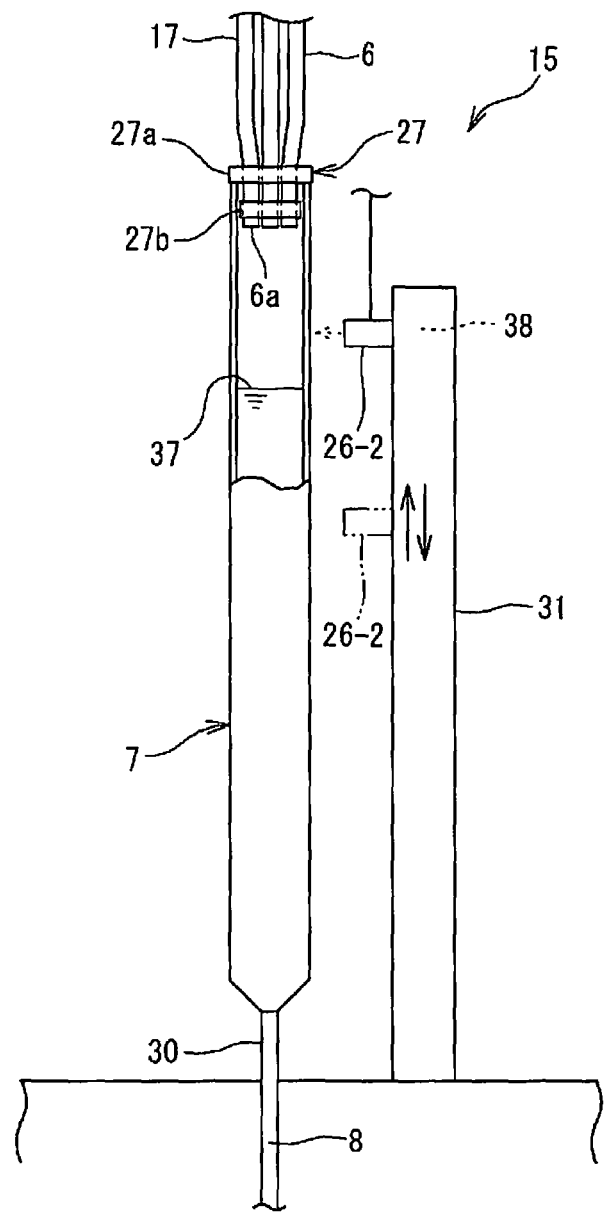
FIG. 4 is a diagram of the simplified configuration of a third example of a measuring mechanism.

In the second example shown in FIG. 3 and the third example shown in FIG. 4, just as in the mode described in the first example shown in FIG. 2, the measuring mechanism 15 comprises the holding unit 27 on which the plurality of outlet pipes 6 converge, and the solutions are introduced to the intermediate container 7 from the plurality of outlet pipes 6 collected and held by the holding unit 27. In the second and third examples, just as in the first example, as shown in FIGS. 3, 4, and 5, the second member 27b had by the holding unit 27 holds the plurality of outlet pipes 6 in a state in which the downstream end 6a of one of the outlet pipes 6 is not in contact with the downstream ends 6a of the other outlet pipes 6. Accordingly, the solution flowing out from the downstream end 6a of one outlet pipe 6 will not come into contact with the downstream ends 6a of the other outlet pipes 6, that is, the solutions can be prevented from mixing. This makes it possible to ensure the purity of the solutions that are temporarily stored in the intermediate container 7.

With the measuring mechanism 15 in the various modes, as described above, the plurality of outlet pipes 6 converge on the intermediate container 7, so the intermediate container 7 comes into contact with the plurality of types of solutions. In view of this, it will sometimes be necessary to clean the intermediate container 7. To this end, the measuring mechanism 15 is equipped with the following configuration. In the following description, the first example will be used as a representative case, but the same applies to the second and third examples.

As shown in FIG. 1, the synthesis device 3 comprises the storage container 2-20 for storing a cleaning liquid. The outlet pipe 6 extending from this storage container 2-20 also converges along with the other outlet pipes 6 on the holding unit 27, allowing the cleaning liquid to be supplied to the intermediate container 7. That is, as shown in FIG. 2, the plurality of outlet pipes 6 converging on the holding unit 27 include an outlet pipe 6 for introducing the cleaning liquid into the intermediate container 7. The supply of the cleaning liquid to the intermediate container 7 is also performed by the gas in the tank 4 (that is, pressure feeding), just as with the solutions. The downstream end 6a of each of the plurality of outlet pipes 6 opens into the intermediate container 7 at a position below the upper end 40 of the intermediate container 7. That is, the solution discharge ports (downstream ends 6a) of the outlet pipes 6 are located below the upper end 40 of the intermediate container 7.

The sensor 26 can detect not only a state in which the solutions have been introduced up to the upper limit of the first position Y1, but also a state in which the cleaning liquid has been introduced up to the second position Y2. The first position Y1 is a position lower than the position of the openings of the downstream ends 6a as shown by the arrow (Y1) in FIG. 2, and the second position Y2 is a position higher than the openings of the downstream ends 6a as shown by the arrow (Y2) in FIG. 2. The second position Y2 is a position lower than the upper end 40 of the intermediate container 7.

When the solutions are selectively supplied from the storage containers 2-1, 2-2, ( . . . , 2-19) storing the solutions shown in FIG. 1 to the intermediate container 7 and measurement is performed, the sensor 26 detects a state in which the solutions have been introduced to the upper limit at the first position Y1. In this embodiment, this detection commences the closing operation of the pinch valves 14, as will be described below. That is, supply of the solution is stopped once a predetermined amount of the solution has been introduced with the first position Y1 as the upper limit. Thus, when measuring the solutions used for performing chemical synthesis in the reaction vessel 9 in the intermediate container 7, the sensor 26 performs detection so that the first position Y1 is not exceeded. To describe specific operation, when the sensor 26 is used to measure a solution at or below the first position Y1, and the sensor 26 detects that the solution has exceeded the first position Y1, the control device 16 receives the detection result of the sensor 26 and outputs an error signal, for example.

By contrast, when the intermediate container 7 is washed out (rather than performing measurement), the sensor 26 detects a state in which the cleaning liquid has been introduced up to the second position Y2 (a filled state). This detection results in the closure of the pinch valve 14 of the outlet pipe 6 extending from the storage container 2-20 in which the cleaning liquid is stored. That is, the supply of the cleaning liquid is stopped once the cleaning liquid is introduced up to the second position Y2. Thus, when cleaning out the intermediate container 7, the sensor 26 performs detection based on the second position Y2.

With this configuration, in measuring the solutions, the first position Y1 is used as the upper limit to measure the solutions. Since the first position Y1 is lower than the position of the openings of the downstream ends 6a, the solutions supplied to the intermediate container 7 can be prevented from coming into contact with the downstream ends 6a of the outlet pipes 6, and a decrease in the purity of the solutions supplied from the outlet pipes 6 can be prevented. On the other hand, when the intermediate container 7 is cleaned out, the intermediate container 7 and the downstream ends 6a of the outlet pipes 6 in this intermediate container 7 can be cleaned with the cleaning liquid introduced up to the second position Y2. Specifically, since the second position Y2 is higher than the openings of the downstream ends 6a, the cleaning liquid supplied to the intermediate container 7 comes into contact with all of the downstream ends 6a, allowing each of the downstream ends 6a to be cleaned. The cleaning liquid here is preferably the main solvent (main solvating medium) that is being used for the plurality of types of the solutions, because this prevents a decrease in the purity of the solutions even if some cleaning liquid remains in the intermediate container 7. Similarly, in the case of the sensor 26-2 that senses the level 37 of the solutions in the intermediate container 7, the first position Y1 is used as the upper limit when measuring, and when cleaning is performed, the cleaning liquid is supplied up to the second position Y2.

We described above a case in which the sensor 26 was used to introduce the solutions into the intermediate container 7, using the first position Y1 as the upper limit, and the cleaning liquid was introduced into the intermediate container 7 up to the second position Y2. This prevents the solutions from coming into contact with the downstream ends 6a of the outlet pipes 6 during measurement, and during cleaning, allows the solutions and the cleaning liquid to be accurately measured so that the cleaning liquid will come into contact with the downstream ends 6a of the outlet pipes 6. As a modification example, without using the sensor 26, it is possible to form a state in which the solutions are introduced into the intermediate container 7 up to the first position Y1, and a state in which the cleaning liquid is introduced into the intermediate container 7 up to the second position Y2. Specifically, the control device 16 manages how long each solution is fed by the feeding means 24 including the introduction pipes 5 and the like, and the feeding means 24 feeds each solution for a predetermined feed time so that the solutions are introduced up to the upper limit of the first position Y1, which is lower than the openings of the downstream ends 6a, and the feeding means 24 feeds cleaning liquid for a predetermined feed time, so that the cleaning liquid is introduced up to the second position Y2, which is higher than the openings of the downstream ends 6a. Thus, the feeding means 24 including the introduction pipes 5 and the like may be configured to fed each solution so as to create a state in which the solution has been introduced up to the upper limit of the first position Y1, and a state in which the cleaning liquid has been introduced up to the second position Y2. In this case, the accuracy of the amount in which the solutions or the cleaning liquid is supplied will be somewhat lower, but the same effect can be achieved as when the sensor 26 is used.

Measurement Processing

The solution measurement processing performed by the measuring mechanism 15 in the synthesis device 3 having the above configuration will now be described. In the first example, the sensor 26 measures a prescribed amount of the solutions by weight, whereas in the second example (and the third example), the sensor 26-2 senses the prescribed amount of the solutions from the liquid level. Accordingly, the signal outputted from the sensor 26 (26-2) differs in each example, but the measurement processing is the same. Therefore, the measurement processing performed by the measuring mechanism 15 in the first example will be described as being representative.

In order to increase measurement accuracy, the synthesis device 3 comprises an adjusting means 32 (see FIG. 1) for adjusting the solution feed rate. An adjusting means 32 may be provided to each outlet pipe 6 to adjust the feed rate (flow rate per unit of time) of the solutions flowing in the outlet pipes 6, but in this embodiment the regulator 11 provided to the upstream pipe 10 functions as the adjusting means 32. With this configuration, there is no need to provide an adjusting means 32 for each of the plurality of outlet pipes 6, so the synthesis device 3 can be simplified.

In this embodiment, as described above, the feed of the solution from each storage container 2 to the intermediate container 7 to be measured is carried out by pressure feed. When the internal pressure of the storage container 2 is raised, the feed rate in supplying the solution to the intermediate container 7 rises, and when the internal pressure is lowered, the feed rate in supplying the solution to the intermediate container 7 goes down. That is, the feed rate to the intermediate container 7 can be increased by adjusting the regulator 11 to raise the internal pressure of the storage container 2. Conversely, the feed rate to the intermediate container 7 can be reduced by adjusting the regulator 11 to lower the internal pressure of the storage container 2.

In view of this, in this embodiment the solutions are pressure fed to the intermediate container 7 in order to perform the measurement processing in the intermediate container 7, but the feed rate of the solutions to be measured is adjusted by the regulator 11 (the adjusting means 32). This is because when the feed rate is high, error is likely to occur in measurement, particularly if the target amount for measurement is small. For instance, there is a greater likelihood that the measurement will exceed the target amount. Therefore, in this embodiment the solution feed rate to the intermediate container 7 is lowered by the regulator 11 below a preset threshold. This suppresses measurement error.

However, if the feed rate is lowered all the time for measuring, measurement may take a long time and work efficiency will suffer. Also, measurement error tends to occur if the feed rate is increased all the time for measuring. In view of this, in this embodiment the feed rate is changed while the solutions are being supplied to the intermediate container 7. Specifically, in the time period (first half) when the prescribed amount (target amount) has yet to be reached in measurement, the feed rate is set relatively high (above the threshold) to shorten the feed time. In the time period (second half) when the prescribed amount (target amount) is reached, the feed rate is set relatively low (changed to be below the threshold) to suppress measurement error. In this way, the regulator 11 lowers the feed rate in the feed termination time zone for measurement to below that in the previous time period (the time period before the termination time period). The operation of the regulator 11 is controlled based on an operation signal sent from the control device 16 to the regulator 11. In this way, in supplying a solution to the intermediate container 7 for measurement, the solution feed rate is set to two stages. As a result, the working efficiency can be improved by increasing the feed rate at the beginning, and measurement error can be suppressed by reducing the feed rate at the end of the measuring.

The timing at which the feed rate is changed may be managed by a timer function of the control device 16, but in this embodiment, since the sensor 26 senses the weight at regular time intervals as mentioned above, if a solution is supplied to the intermediate container 7 in a predetermined amount that is less than the prescribed amount (such as 70% of the prescribed amount), the control device 16 will output a signal to the regulator 11 to lower the feed rate.

As in the second example (and third example), in the case of the sensor 26-2 that senses the level 37 of the solutions in the intermediate container 7, a (first) sensor 26-2 is positioned lower than the liquid level corresponding to the prescribed amount, and when this sensor 26-2 senses the level 37, the control device 16 outputs a signal to the regulator 11 to lower the feed rate. A (second) sensor 26-2 may also be installed at the liquid level corresponding to the prescribed amount, and it may be confirmed with this sensor 26-2 that the prescribed amount has been reached.

Also, in order to reduce measurement error, the synthesis device 3 in this embodiment further comprises the following configuration. The valves (pinch valves 14) provided to the outlet pipes 6 each function as a valve for stopping the feed to the intermediate container 7 used for measurement. The opening and closing of the pinch valves 14 is based on a command signal from the control device 16. In view of this, the control device 16 outputs a closing command signal to a pinch valve 14 before the solution held in the intermediate container 7 reaches the prescribed amount (target amount). In order to start this closing operation early, how much time the closing operation of the pinch valve 14 takes is measured, and the control device 16 causes the pinch valve 14 to start closing before the solution reaches the prescribed amount (target amount) based on this time information. Alternatively, as another means, in order to start the closing operation early, information about the flow amount of a solution fed during the closing operation of the pinch valve 14 is acquired in advance, and the control device 16 causes the pinch valve 14 to start closing before the solution reaches the prescribed amount (target amount) based on this flow amount information. Furthermore, as another means, how much time it takes for the pinch valve 14 to close is measured, information about the flow amount of the solution that is fed during the closing operation is acquired in advance, and the control device 16 starts closing the pinch valve 14 before the solution reaches the prescribed amount (target amount) based on this time information and information about the flow amount during the closing operation. With the configuration in each of the above modes, the prescribed amount (target amount) can be obtained very accurately by estimating how much solution will flow during the closing of the pinch valve 14, and starting the closing operation of the pinch valve 14 at an earlier point.

While the solution is being supplied to the intermediate container 7 for measurement, the sensor 26 takes measurements at regular time intervals, and the control device 16 acquires the measurement signal from the sensor 26 at regular time intervals and outputs a closing signal to the pinch valve 14 based on this signal. Consequently, when the solution supplied to the intermediate container 7 reaches the predetermined amount (target amount), the pinch valve 14 can start closing as described above. This configuration allows the solution to be measured in real time. That is, with this configuration, since the solution can be measured while the prescribed amount (the target) is monitored, mechanical measurement error and the like can be avoided more than when measuring by a pressure-feed method or a pump method, and as a result it is possible to obtain the prescribed amount of the solutions very accurately.

In addition, when the pinch valve 14 is closed due to detection by the sensor 26, and the supply of the solution to the intermediate container 7 is stopped, the control device 16 can determine whether or not the solution held in the intermediate container 7 is correct according to the prescribed amount. If the amount is determined to be correct (within a specified error range), the solution in the intermediate container 7 is sent to the reaction vessel 9. If the amount is determined not to be correct, failure processing is performed. This failure processing can involve discarding the solution in the intermediate container 7, for example.

Synthesis Device 3

As described above, the synthesis device 3 in this embodiment is a device for selectively feeding the plurality of types of solutions from the plurality of storage containers 2 and subjecting them to chemical synthesis, and comprises the reaction vessel 9 in which the selectively fed the solutions are placed and a synthesized product is generated from the materials contained in these solutions, and the measuring mechanism 15 that is provided between the storage containers 2 and the reaction vessel 9 and measures the solutions fed to the reaction vessel 9. With this synthesis device 3, the required amount of the solutions can be measured and sent to the reaction vessel 9 by the measuring mechanism 15, and the solution usage efficiency can be improved over that in the past.

Figure 8:
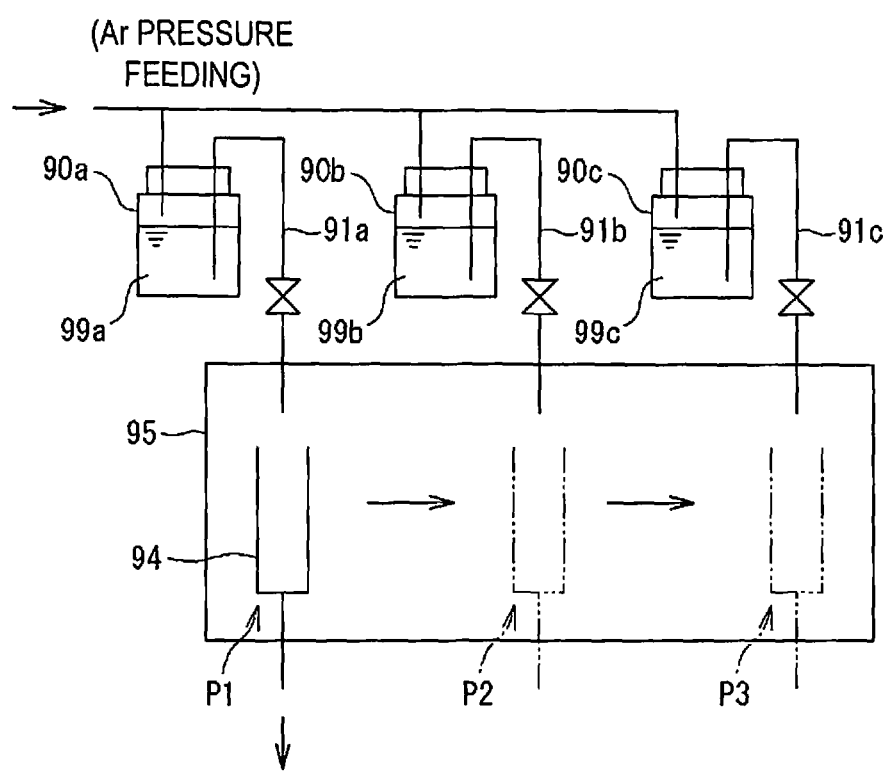
FIG. 8 is a simplified diagram of a conventional synthesis device.

Also, as described above, the synthesis device 3 in this embodiment is a device for selectively feeding the plurality of types of solutions from the plurality of storage containers 2 and subjecting them to chemical synthesis, and has the intermediate container 7 that is provided between the storage containers 2 to the reaction vessel 9. The outlet pipes 6 converge on the intermediate container 7, and solutions are introduced from the outlet pipes 6. With the synthesis device 3, the solutions fed from the plurality of storage containers 2 are each temporarily introduced into the intermediate container 7, and a synthesized product is generated from the solutions fed from the intermediate container 7 to the reaction vessel 9. Accordingly, there is no need for a mechanism for moving the reaction vessel 9, nor is it necessary to move the reaction vessel 9 every time a solution is fed as in prior art (see FIG. 8), so the processing operation is simplified. Thus, the device configuration is simplified, there are fewer places where a problem may occur, and the result is a more reliable synthesis device 3. Also, the length of time required for synthesis can be shortened. Furthermore, with the configuration of this embodiment, when it is necessary to mix the plurality of types of solutions, these solutions can be fed to the reaction vessel 9 after first being mixed in the intermediate container 7, and this improving the reaction efficiency.

The synthesis device 3 in this embodiment comprises the measuring mechanism 15 that is provided between the storage containers 2 and the reaction vessel 9 and measures the solutions fed to the reaction vessel 9, and the measuring mechanism 15 includes the sensor 26 (26-2) that measures the solutions introduced into the intermediate container 7. With the synthesis device 3, the required amount of the solutions can be measured and fed to the reaction vessel 9 by the measuring mechanism 15, and the solution usage efficiency can be improved as over that in the past.

The configuration is such that a plurality of outlet pipes 6 converge on the intermediate container 7, and the solutions are introduced from the outlet pipes 6, respectively, so that there are a plurality of types of solutions that are necessary, but all that is needed for measurement is the one set of the measuring mechanism 15 (the intermediate container 7 and the sensor 26 (26-2)). That is, because the intermediate container 7 is shared, a measuring mechanism 15 does not have to be provided for each outlet pipe 6 (solution), and the configuration of the synthesis device 3 can be simplified. Also, when two or more types of the solutions are supplied to the intermediate container 7, the plurality of types of solutions can be mixed and measured in the intermediate container 7. In this case, the solutions are mixed at a stage prior to the introduction of the solutions into the reaction vessel 9, so the mixing takes less time.

In the first example above (see FIG. 2), the measuring mechanism 15 has the sensor 26 for measuring the weight in the intermediate container 7, and in the second example (FIG. 3) and the third example (FIG. 4), the measuring mechanism 15 has the sensor 26-2 for measuring the level of the solutions stored in the intermediate container 7. Here, let us consider a device that makes use of a pump 93 to feed solutions (see FIG. 9). With the device using the pump 93 shown in FIG. 9, it is conceivable that the total feed amount can be calculated based on the feed amount per unit time by the pump 93 (rated feed amount) and the operating time of the pump 93. However, it is expected that the calculated total feed amount will not be accurate due to loss along the flow path and the like. That is, when the pump 93 is used, the actual feed amount and the calculated value often deviate from each other, and therefore even with a device featuring a pump, a plurality of types of solutions may be supplied in amounts greater than the amounts that are theoretically required, and excessive amounts of the solutions will be used, which drives up the cost, particularly when the synthesized product is being mass-produced. In view of this, in this embodiment the solutions are temporarily held and measured in the intermediate container 7, and rather than measuring the target solutions under feed conditions, the resulting solutions are directly measured, so the solutions can be measured very accurately, and since the measured solutions are sent to the reaction vessel 9, it is possible to minimize the unnecessary use of solutions and to reduce the cost. Thus, providing the measuring mechanism 15 as in this embodiment is completely different in a technological sense from flow amount management based on the drive of the pump 93.

Figure 9:
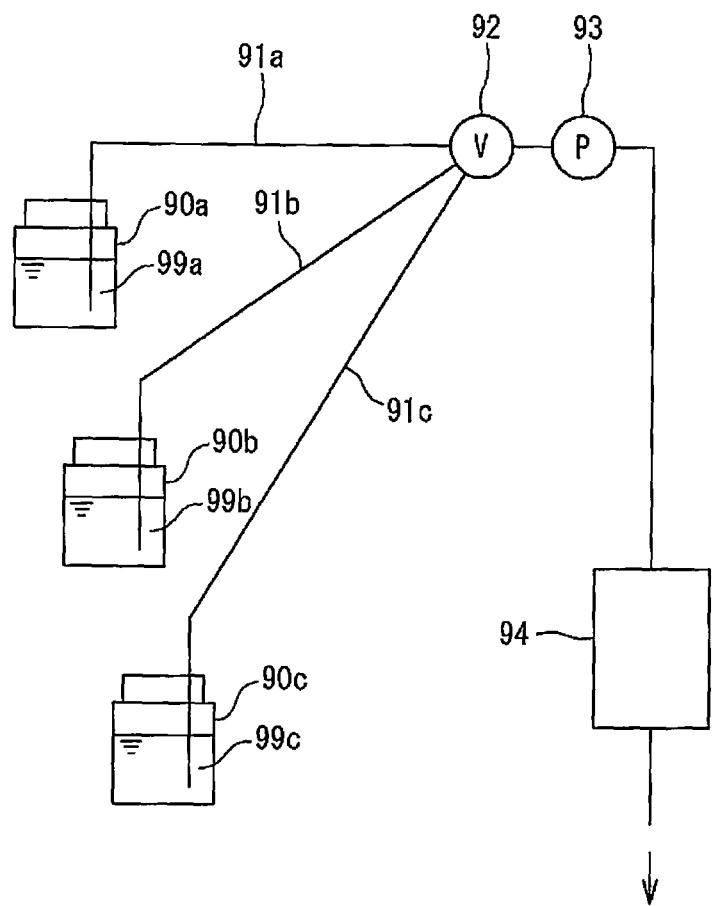
FIG. 9 is a reference diagram of a synthesis device in which a pump is used.

Also, in the example in FIG. 9, the feed of the solutions is carried out by the plunger pump 93, and even though the solutions can be accurately measured by controlling the feed amount per unit of time (rated feed amount) of the plunger pump 93, there is the risk that crystallization of the solutions in the plunger pump 93 may exert a load on the plunger pump 93, and this can result in damage to the drive system, such as seal breakage, which is a problem in that the durability of the device as a whole will tend to suffer. On the other hand, with the synthesis device 3 in this embodiment, since no pump is used for feed, the durability of the overall device can be improved.

With this embodiment (the first example, FIG. 2), the measuring mechanism 15 can selectively acquire and measure the plurality of types of solutions, and to this end, the measuring mechanism 15 comprises the holding unit 27 that collects and holds the plurality of outlet pipes 6 through which the plurality of types of solutions pass, the intermediate container (measuring container) 7 that receives the solutions flowing out of the outlet pipes 6, and the weight sensor 26 that measures the weight in this intermediate container 7. As discussed above, the holding unit 27 and the intermediate container 7 are provided in a state of non-contact. This increases measurement accuracy. The reason for this is that, as discussed above, if the outlet pipes 6 through which the solutions pass are in contact with the intermediate container 7, then if tension is acting on the outlet pipes 6, for example, the measurement result produced by the weight sensor 26 may be adversely affected, but with the configuration in this embodiment, the outlet pipes 6 do not affect the weight sensor 26.

Also, as discussed above, the outlet-side pipe 30 connected to the downstream side of the intermediate container 7 is constituted by a spiral elastic tube, so even when a tension, as an external force, is exerted on the outlet-side pipe 30, this external force can be released by elastically deforming the tube as a whole. As a result, it is less likely that the measurement result produced by the weight sensor 26 will be affected by this external force, and very accurate measurement will be possible.

Also, in this embodiment the configuration is such that the plurality of outlet pipes 6 converge on the intermediate container 7 and the respective solutions are introduced from these outlet pipes 6. Accordingly, although the plurality of types of solutions are required, only one set of the measuring mechanism 15 (the intermediate container 7 and the sensor 26) is needed for measurement. That is, because the intermediate container 7 is shared, a measuring mechanism 15 does not have to be provided for every outlet pipe 6 (solution), and the configuration of the synthesis device 3 can be simplified. Also, if there are two or more types of solutions to be supplied to the intermediate container 7, the plurality of types of solutions can be mixed and measured in the intermediate container 7. In this case, since the solutions are mixed at a stage prior to the introduction of each solution into the reaction vessel 9, the mixing takes less time.

With the synthesis device 3 shown in FIG. 1, the solution feeding means is a pressure-feed type, and feed is performed by using the gas that fills the tank 4 and taking advantage of the pressure difference between the upstream container and the downstream container. Therefore, this is more advantageous than when a pump (electric pump or hydraulic pump) is included in the feeding means, in terms of contamination over the entire flow path 25, failure due to clogging caused by foreign matter, and disposability. In other words, when a pump is used, the movable parts of the pump are exposed in the flow path, which is disadvantageous in terms of contamination and clogging by foreign matter, due to the generation of wear dust or the peeling of sliding members or the like had by these movable parts. Moreover, if the solvent contained in the solution solidifies (crystallizes), this can lead to a failure of the pump. Furthermore, with the synthesis device 3, it is necessary to replace parts that come into contact with the liquid, such as pipes and devices with which the solution comes into contact, either periodically or at a predetermined timing (at a predetermined frequency). As described above, in this embodiment, the starting and stopping of the supply of solutions from the storage containers 2 to the intermediate container 7 is performed by the pinch valves 14, but these pinch valves 14 are not replaced because their drive components do not come into contact with the solutions. That is, just the soft tubes that are squeezed by the pinch valves 14 need to be replaced, which is in terms of disposability.

Synthesis Device 3 in Other Mode (Part 1)

Figure 6:
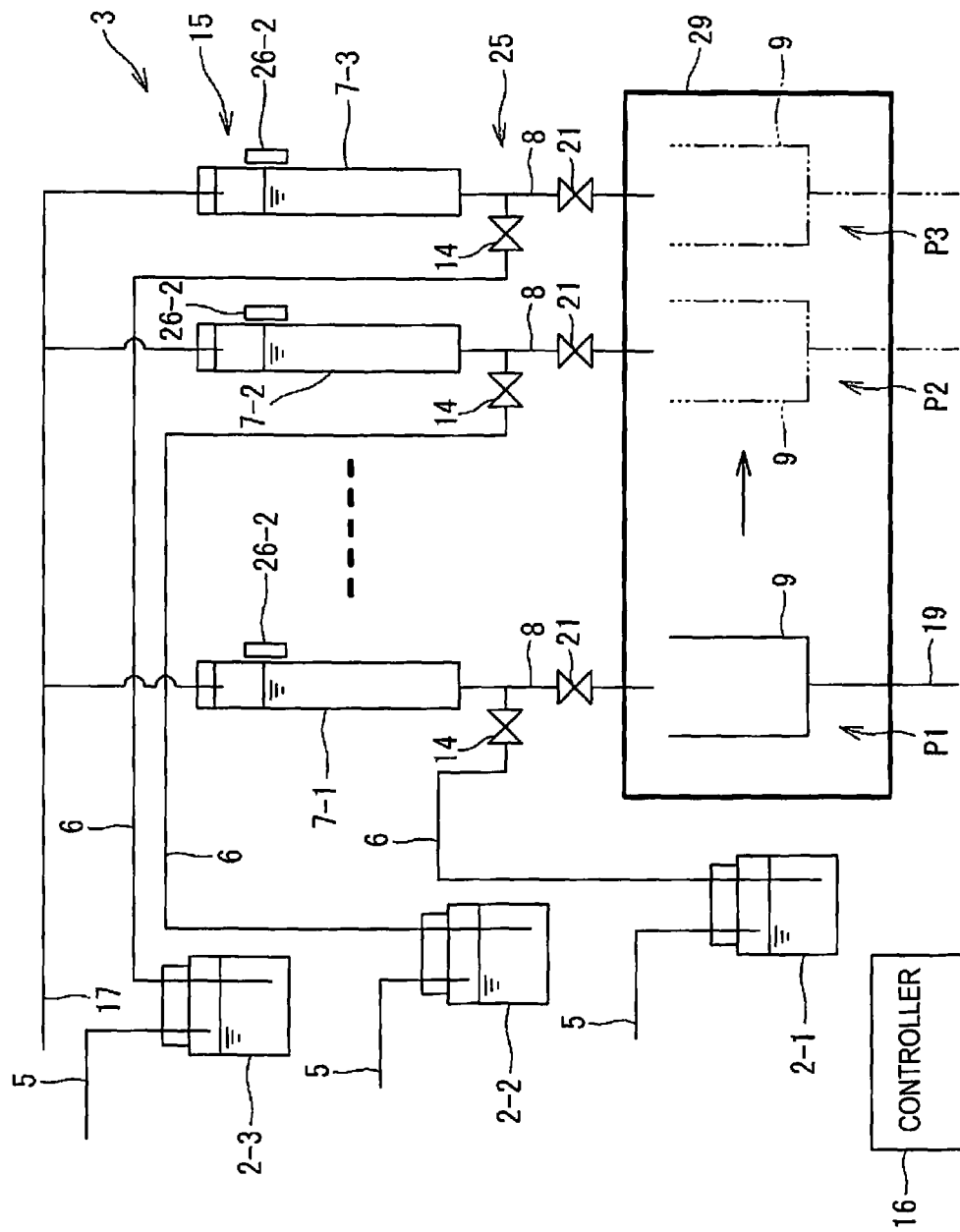
FIG. 6 is a diagram of the configuration in another example of a synthesis device.

It was described above that the measuring mechanism 15 in the above embodiment (FIG. 1) has a single intermediate container 7 that functions as a measuring container, the plurality of outlet pipes 6 converge on the intermediate container 7, the solutions are introduced from these outlet pipes 6 into the intermediate container 7, respectively, and the solutions are measured in the intermediate container 7. We will now describe a mode in which a plurality of intermediate containers 7 functioning as measuring containers are provided. FIG. 6 is a configuration diagram another example of the synthesis device 3. In the synthesis device 3 shown in FIG. 6, components that are the same as those in the synthesis device 3 shown in FIG. 1 are numbered the same. With the synthesis device 3 shown in FIG. 6, intermediate containers 7-1, 7-2, 7-3, . . . are provided for the storage containers 2-1, 2-2, 2-3, . . . , respectively, and these pairs are each connected via an outlet pipe 6. That is, the measuring mechanism 15 has the plurality of intermediate containers 7-1, 7-2, 7-3, . . . . The solutions that are selectively fed from the storage containers 2-1, 2-2, 2-3, . . . and measured in the intermediate containers 7-1, 7-2, 7-3, . . . , respectively, are sent to a single reaction vessel 9. Accordingly, this synthesis device 3 comprises the storage containers 2-1, 2-2, 2-3, . . . that individually store the plurality of types of solutions, the reaction vessel 9 in which the solutions are mixed, and a chamber 29 that houses this reaction vessel 9. The storage containers 2-1, 2-2, 2-3, . . . are connected to the chamber 29 by the outlet pipes 6. The downstream ends of the plurality of outlet pipes 6 are provided corresponding to a first position P1, a second position P2, and a third position P3, respectively. The reaction vessel 9 is configured so that it can be moved in the chamber 29 by an actuator (not shown), and can be moved to and stopped at the first position P1, the second position P2, and the third position P3. Therefore, the reaction vessel 9 is configured such that it selectively moves to the positions of the solutions that are to be mixed and is necessary for the production of the synthesized product (the first position P1, second position P2, and third position P3), and successively receives the solutions supplied from the downstream ends of the outlet pipes 6 at these positions. When the reaction vessel 9 is moved in this way, the solutions selectively fed from the plurality of storage containers 2-1, 2-2, 2-3, . . . to the plurality of intermediate containers 7-1, 7-2, 7-3, . . . are introduced into the reaction vessel 9 in a specific order, and a synthesized product is produced in this reaction vessel 9.

As described above, the synthesis device 3 shown in FIG. 6 is a device for measuring with independent intermediate containers 7-1, 7-2, 7-3, . . . for each of the plurality of storage containers 2-1, 2-2, 2-3, . . . , selectively feeding the measured plurality of types of solutions, and subjecting these to chemical synthesis, the device comprising the plurality of outlet pipes 6 extending from the plurality of storage containers 2-1, 2-2, 2-3, . . . , respectively, containing the plurality of types of solutions, and a feeding means for feeding the solutions in these storage containers 2-1, 2-2, 2-3, . . . through the outlet pipes 6. As in the case in FIG. 1, the feeding means can be one that employs pressure feeding. The synthesis device 3 further comprises the measuring mechanism 15 and the reaction vessel 9. The measuring mechanism 15 is provided in a middle of the overall flow path 25 including the plurality of outlet pipes 6, between the storage containers 2-1, 2-2, 2-3, . . . and the reaction vessel 9, and measures the solutions sent to the reaction vessel 9. The solutions selectively sent from the storage containers 2-1, 2-2, 2-3, . . . are finally put into the reaction vessel 9 and a synthesized product is generated.

Synthesis Device 3 in Other Mode (Part 2)

Figure 7:
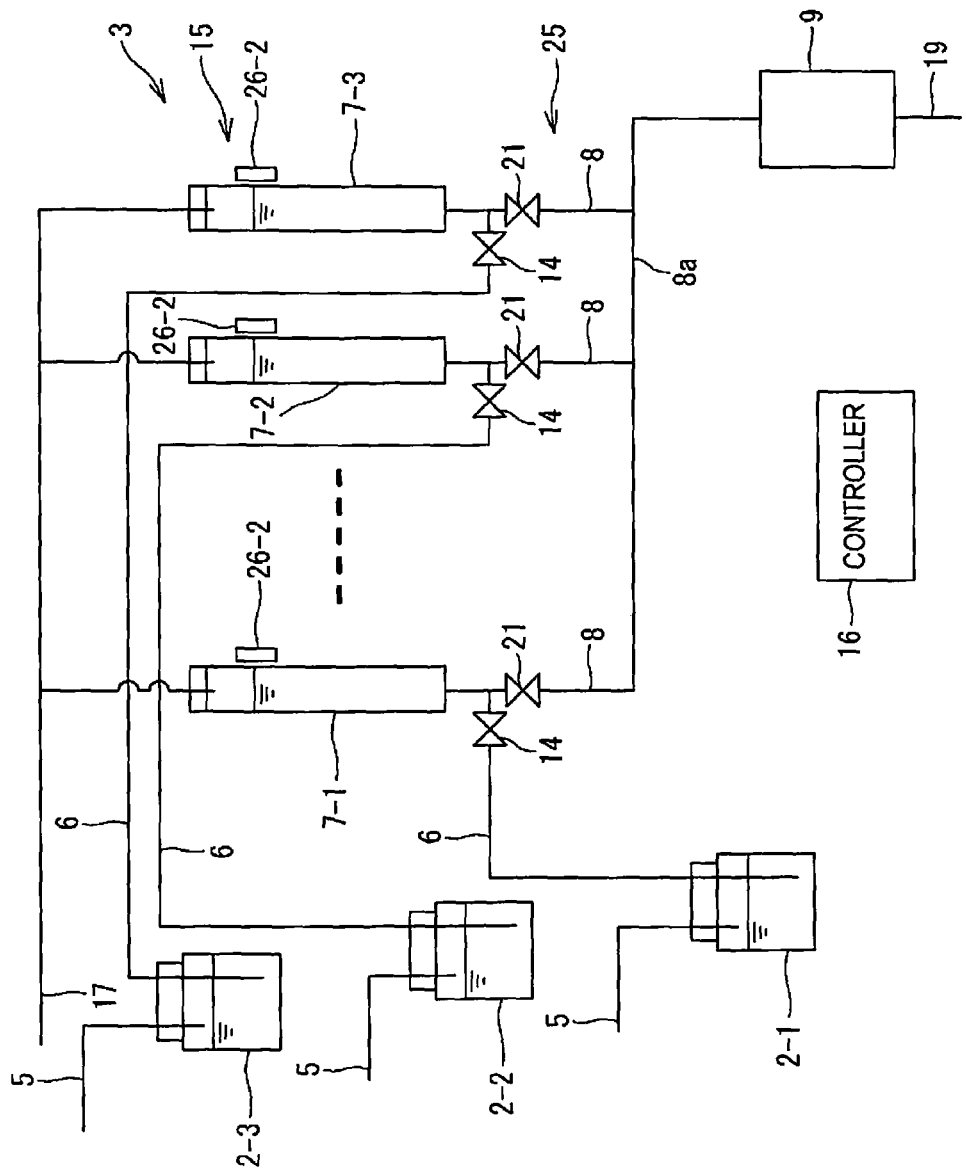
FIG. 7 is a diagram of the configuration of yet another example of a synthesis device.

FIG. 7 is a configuration diagram of yet another example of the synthesis device 3. In the synthesis device 3 shown in FIG. 7, components that are the same as those in the synthesis device 3 shown in FIG. 1 are numbered the same. Again with the synthesis device 3 shown in FIG. 7, the measuring mechanism 15 has a plurality of intermediate containers 7-1, 7-2, 7-3, . . . . With the synthesis device 3 shown in FIG. 7, the intermediate containers 7-1, 7-2, 7-3, . . . are provided for the containers 2-1, 2-2, 2-3, . . . , respectively, and these pairs are each connected via an outlet pipe 6. The solutions measured in the intermediate containers 7-1, 7-2, 7-3, . . . are sent to one reaction vessel 9. Therefore, intermediate pipes 8 extending from the intermediate containers 7-1, 7-2 and 7-3, respectively, merge into a single common pipe 8a, and this common pipe 8a is connected to the reaction vessel 9. Consequently, the solutions selectively sent from the plurality of storage containers 2-1, 2-2, 2-3, . . . to the plurality of intermediate containers 7-1, 7-2, 7-3, . . . are put into the reaction vessel 9 in a predetermined order, and a synthesized product is generated in the reaction vessel 9.

As described above, the synthesis device 3 shown in FIG. 7 is a device for measuring with independent intermediate containers 7-1, 7-2, 7-3, . . . for the plurality of storage containers 2-1, 2-2, 2-3, . . . , respectively, selectively feeding the measured plurality of types of solutions, and subjecting these to chemical synthesis, the device comprising the plurality of outlet pipes 6 extending from the plurality of storage containers 2-1, 2-2, 2-3, . . . , respectively, that contain the plurality of types of solutions, and a feeding means for feeding the solutions in these storage containers 2-1, 2-2, 2-3, . . . through the outlet pipes 6. As in the case in FIG. 1, the feeding means can be one that employs pressure feeding. The synthesis device 3 further comprises the measuring mechanism 15 and the reaction vessel 9. The measuring mechanism 15 is provided in a middle of the overall flow path 25 including the plurality of outlet pipes 6, between the storage containers 2-1, 2-2, 2-3, . . . and the reaction vessel 9, and measures the solutions sent to the reaction vessel 9. The solutions selectively sent from the storage containers 2-1, 2-2, 2-3, . . . are finally put into the reaction vessel 9 and a synthesized product is generated.

In FIGS. 6 and 7, the sensor for measuring is the sensor 26-2 that senses the liquid level, but may instead be a weight sensor just as in the mode shown in FIG. 1. Also, the configurations described in the mode shown in FIG. 1 can be applied to the synthesis devices 3 shown in FIGS. 6 and 7. Again with the synthesis devices 3 shown in FIGS. 6 and 7, the necessary amount of solutions can be measured and sent to the reaction vessel 9, and the solution usage efficiency can be improved over that in prior art.

The embodiments disclosed above are illustrative in all respects and not limiting in nature. That is, the synthesis device of the present invention is not limited to the illustrated modes, and may be other modes within the scope of the present invention. For example, the sensor 26 provided to the measuring mechanism 15 was described as a weight sensor featuring a strain type of load cell, but may instead be a weight sensor with some other configuration. Also, the configuration for attaching this sensor 26 may be different from the illustrated modes. A case was described in which the adjusting means 32 for adjusting the feed rate of the solution to the intermediate container 7 was constituted by the regulator 11 provided to the upstream pipe 10, but other configurations may be used instead. In the above embodiments, the means for feeding the solution all involved pressure feeding, but some or all of them may be driven by some other power. In the above embodiments, a case was described in which the pinch valves 14 were employed as valves for stopping the supply of solutions from the storage containers 2 to the intermediate container 7, but some other type of valve may be used instead.

The invention claimed is:

1. A synthesis device comprising:
a plurality of pipes extending from a plurality of storage containers, respectively, in which a plurality of types of solutions are stored;
a feeding unit configured to feed the solutions in the storage containers through the pipes;
a reaction vessel in which the solutions selectively fed from the storage containers are put to generate a synthesized product by chemical synthesis; and
a measuring mechanism provided between the storage containers and the reaction vessel in a middle of an overall flow path including the pipes, the measuring mechanism being configured to measure the solutions fed to the reaction vessel, the measuring mechanism having a measuring container on which the pipes converge and into which the solutions from the pipes are introduced, respectively, a sealed container that houses the measuring container, and a weight sensor that is configured to measure a weight in the measuring container such that the solutions are measured in the measuring container,
the feeding unit being configured to feed the solutions by pressure from the storage containers to the measuring container using pressurized gas, and
the synthesis device further comprising a pressurized gas pipe that is configured to feed pressurized gas to the sealed container without passing through the storage containers to feed the solutions by pressure from the measuring container to the reaction vessel by pressurizing the sealed container.

2. The synthesis device according to claim 1, wherein the measuring container is provided in a middle of the overall flow path.

3. The synthesis device according to claim 1, further comprising
an adjusting unit configured to adjust a feed rate of the solutions to be measured.

4. The synthesis device according to claim 1, further comprising
an adjusting unit configured to lower a feed rate during a feed termination time period for a measurement to a level below that during a prior time period.

5. The synthesis device according to claim 1, further comprising:
a valve configured to stop a feed for a measurement; and
a control device configured to acquire sensor signals for the measurement at regular time intervals and configured to output a closing operation start signal to the valve based on the sensor signal.

6. The synthesis device according to claim 1, further comprising:
a valve configured to stop a feed for a measurement,
the valve being configured to start to close before the solutions reach a prescribed amount.

7. The synthesis device according to claim 1, wherein the measuring mechanism further has a holding unit that collectively holds the pipes, and is provided in a state of non-contact with the measuring container.

8. The synthesis device according to claim 1, wherein downstream ends of the pipes open into the measuring container at a position below an upper end of the measuring container,
the pipes include a pipe that is configured to introduce a cleaning liquid into the measuring container, and
the weight sensor is configured to detect a state in which the solutions have been introduced up to no higher than a first position that is lower than openings on the downstream ends of the pipes, and a state in which the cleaning liquid has been introduced up to a second position that is higher than the openings on the downstream ends of the pipes.

9. The synthesis device according to claim 1, wherein downstream ends of the pipes open into the measuring container at a position below an upper end of the measuring container,
the pipes include a pipe that is configured to introduce a cleaning liquid into the measuring container, and
the feeding unit is configured to feed the solutions so as to result in a state in which the solutions have been introduced up to no higher than a first position that is lower than openings on the downstream ends of the pipes, or a state in which the cleaning liquid has been introduced up to a second position that is higher than the openings on the downstream ends of the pipes.

10. The synthesis device according to claim 1, further comprising
a holding unit that collectively holds the pipes,
the solutions being introduced into the measuring container from the pipes collectively held by the holding unit, respectively, and the holding unit holding the pipes in a state in which a downstream end of one of the pipes is not in contact with downstream ends of the other pipes.

11. The synthesis device according to claim 1, wherein a pressurized gas source of the pressurized gas for feeding the solutions by pressure from the storage containers to the measuring container is the same as a pressurized gas source of the pressurized gas for feeding the solutions by pressure from the measuring container to the reaction vessel.

* * * * *